FORMATION OF JUNCTION IN SEMI-CONDUCTOR

Filed Dec. 3, 1953

INVENTORS
FRANK A. BRAND
HAROLD JACOBS
ALEXANDER P. RAMSA
BY Harry M. Saragovitz
ATTORNEY

1

2,854,362

FORMATION OF JUNCTION IN SEMI-CONDUCTOR

Frank A. Brand, West Long Branch, Harold Jacobs, Long Branch, and Alexander P. Ramsa, Neptune, N. J., assignors to the United States of America as represented by the Secretary of the Army Application December 3, 1953, Serial No. 396,087

2 Claims. (Cl. 148—1.5)

(Granted under Title 35, U. S. Code (1952), sec. 266)

The invention described herein may be manufactured and used by or for the Government for governmental purposes, without the payment of any royalty thereon.

This invention relates to means for translating electric signals and more particularly to circuit elements utilizing semi-conductors. The invention also relates to method for preparing such circuit elements.

In the conventional point contact transistor in use today, there are generally employed a germanium body containing a small amount of donor or acceptor impurity, two pointed probes a predetermined distance apart on the surface of the body and making rectifier contact therewith and a third ohmic contact or base electrode on the opposite surface of the germanium. The rectifier contacts are the emitter and collector respectively depending upon the type of impurity contained in the germanium and the consequent polarities applied, the emitter being biased in the forward or low resistance direction of current flow and the collector being biased in the reverse or high resistance direction. The operation of such a transistor can be substantially improved by an electrical forming process in which the peak back voltage is applied to either one or both of the rectifier contacts between it and the base electrode or by a process in which a current is passed between the emitter and collector electrode. The effect of this treatment is believed to lie in a concentrated application of electric field and heat to the material in the immediate neighborhood of the point resulting in diffusion or electrolysis of impurities from the probe metal into the germanium, and thus in an improvement of the electrical characteristics in the contact.

Germanium transistors, probably due to their low melting point and other physical and chemical characteristics fail to operate properly and consistently at slightly elevated temperatures (about 80° C.). Therefore much interest has been shown in the use of silicon semi-conductor bodies in transistors as silicon, due to its high melting point and thermal stability, theoretically should perform usefully at more elevated temperatures.

Many attempts have been made to prepare transistors consisting of silicon containing either donor or acceptor impurities. However, it has been found to be very difficult to prepare silicon transistors which have characteristics sufficiently satisfactory so as to make their use practicable. Two of the difficulties which have been most difficult to solve have been the formation of good barrier layers at the points of rectifier contact and the enhancement of the silicon transistor properties once the point contacts are formed.

It is, accordingly, a primary object of the present invention to provide a method for forming a silicon point contact translating device.

Another object is to provide a translating device prepared by the method of the present invention as set forth in the preceding object.

In accordance with the present invention there is provided a circuit element comprising a body of silicon of a first conductivity type, a zone of opposite conductivity type extending inwardly from one surface thereof, an emitter electrode making a point contact with the zone, a collector electrode making a point contact with the surface outside the zone and spaced a predetermined distance from the emitter electrode and a base electrode making an ohmic contact with the silicon body.

Also, in accordance with the present invention there is provided a method for preparing a silicon semi-conductor body for an electrical translating device comprising surging an A. C. current in an inert gas atmosphere through a sandwich arrangement of a probe, a mass of a first significant impurity which imparts a first type of conductivity and a block of silicon having a significant second impurity therein which imparts an opposite type conductivity whereby said impurity diffuses through the block forming an impurity zone of said first type conductivity extending inwardly from the surface and thereafter cooling said body.

For a better understanding of the invention together with other and further objects thereof, reference is had to the following description taken in connection with the accompanying drawing and its scope will be pointed out in the appended claims.

As an aid to a full understanding of the description hereinafter of specific embodiments of the invention, a brief discussion of some pertinent principles and phenomena, and an explanation of certain terms employed in the description are set forth.

Semi-conduction may be classified as two types, one known as conduction by electrons or the excess process of conduction and the other known as conduction by holes or the defect process of conduction. Examples of semi-conductive materials are germanium and silicon.

The terms N-type and P-type are applied to semi-conductive materials which tend to pass current easily when the material is biased respectively negative or positive with respect to a conductive contact and pass current with difficulty when the reverse biasing is applied. N-type semi-conductor also specifically means that the quite pure semi-conductive material contains a significant pentavalent impurity such as arsenic antimony, bismuth and phosphorus which when present in the semi-conductive material provides an excess of electrons so that conduction therein is by electrons. P-type means a semi-conductive material containing a significant trivalent impurity such as boron aluminum, gallium and indium which causes a deficiency of electrons in the material so that the conduction is by the holes, the majority carrier. N-type impurities are also known as "donor" impurities and P-type as "acceptor" impurities.

Figure 1:
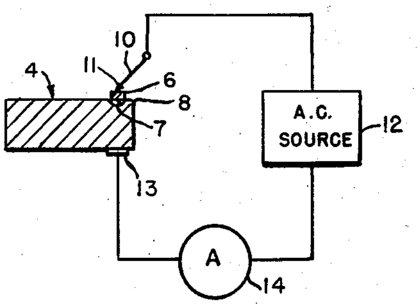
Figure 1 depicts an apparatus for preparing a semi-conductor body in accordance with a preferred embodiment of the present invention.

Referring now specifically to Figure 1, there is shown a block of silicon material 4 containing a predetermined amount of significant impurity. The silicon should be relatively pure and have a resistance at least 0.1 ohm although it is preferred to be greater. The concentration of significant impurity, although not particularly critical, should not exceed 0.1%. As stated above, if the impurity present is a pentavalent element it is an N-type material and if it is trivalent it is a P-type material. Assuming the situation where block 4 is of P-type material, a small amount of pentavalent impurity 6 such as arsenic, antimony, bismuth, phosphorus, or the like is placed on a surface 8 thereof. A relatively heavy tungsten probe 10 is placed against impurity 6 to maintain it in intimate contact with surface 8 of block 4. Probe 10 and block 4 are connected to the terminals of an A. C. potential source 12 which may be a variac or other suitable means well known in the art. Since it is desired to have a high resistance only at the probe contact, the contact between block 4 and A. C. source 12 is an ohmic contact 13. An ammeter 14 is provided in the circuit to monitor the application of the proper amount of current through probe 10, impurity 6 and block 4. In a situation where block 4 is of N-type silicon, that is, containing a significant amount of pentavalent impurity, then impurity 6 is a trivalent element.

In operation, an A. C. current such as a 60 cycle current of from 1 to 4 amperes is passed through the sandwich of block 8, impurity 6 and probe 10, in an inert atmosphere such as helium, nitrogen, or other inert gas. In a very short period, say 1 or 2 seconds, the total mass or impurity will melt and form as a blob on the point 11 of probe 10. At this point, probe 10 with the blob of impurity thereon is separated from the surface 8 of block 4 a small distance, about a mil or so, and with an A. C. potential sufficient to cause a current of from 1 to 4 amperes to flow through probe 10, impurity 6 and block 4, the contact between block 4 and blob of impurity 6 is intermittently broken, thus effecting a periodic arcing between the block and the blob of impurity. The current is applied for a short period, such as up to about 10 seconds. During this arcing, it is believed that the impurity volatilizes and an ion stream thereof which is very penetrating is formed in the arc and enters into block 8 for a distance of several mils. An impurity zone 7 of opposite type conductivity than that of block 4 is, thereby, provided in block 4. The temperature at the point of the arc may exceed 800° C. permitting ready diffusion of the impurity into the semi-conductive block. After this arcing treatment, the block is allowed to cool in the nitrogen or other inert gas atmosphere.

Figure 2:
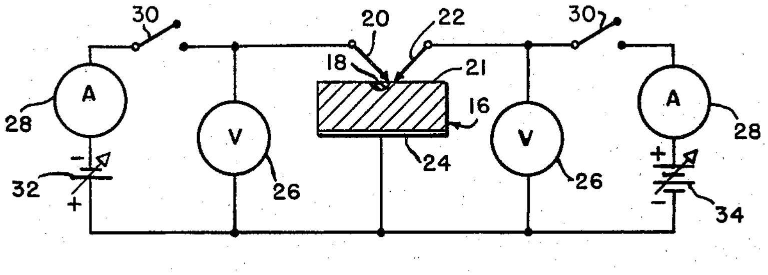
Figure 2 is a schematic diagram partly in cross section illustrative of a semi-conductor amplifier utilizing the aforestated semi-conductor body.

In Figure 2, a semi-conductor block 16 formed by the method outlined above and containing an opposite conductivity impurity zone 18 is shown utilized in a three electrode translating device. A first tungsten probe 20, the emitter electrode makes a point contact with the surface 21 of block 16 at zone 18 and a second tungsten probe 22, the collector electrode makes point contact with the surface of block 16 a small distance, such as a mil or so, from emitter electrode 20. It has been found that since impurity zone 18 is provided by the arcing method as described, it is not necessary to use Phosphor bronze probes as with conventional germanium transistors. As is shown, emitter electrode 20 need not make contact with zone 18 at its center portion, but the contact may be made at the periphery thereof to enable close spacing of both point contact electrodes as it is desired that collector electrode 22 make contact with block 16 near but outside of impurity zone 18. A base electrode 24 makes ohmic contact with block 16 as shown. Voltmeters 26 and ammeters 28 are provided for convenience merely to compare input and output voltages and currents respectively. In the same manner, switches 30 are provided to observe the operation of the device.

Potential source 32 is provided to properly bias emitter 20 in the forward direction and potential source 34 is provided to bias collector 22 in the reverse direction. In the embodiment of Figure 2, the polarities provided are for a device where the semi-conductive material is of P-type conductivity, the impurity in zone 18 is a pentavalent impurity and the zone is of N-type conductivity. Of course, if the semi-conductor block 16 is of N-type conductivity, the impurity in zone 18 is a trivalent impurity, zone 12 is of P-type conductivity and the polarities of sources 32 and 34 are reversed.

Without necessarily subscribing to any particular theory of operation and relying mainly on the theory of transistor operation as has been accepted in the art, the following explanation is presented as to the operation of the device of Figure 2 and to account for the experimental results. Where the block is essentially of P-type conductivity and the impurity zone is of N-type conductivity, the application of a negative bias to the emitter injects electrons into the impurity zone. These electrons are drawn strongly by an electrostatic field caused by applying a strong positive bias to the collector electrode. Where N-type semi-conductive material having a P-type impurity zone is used, the application of a positive bias to the emitter electrode injects holes into the impurity zone and the application of a strong negative bias to the collector electrode provides the electrostatic field which pulls the holes to the collector. Typical potentials which may be applied are a fraction of volt to about 5 volts to the emitter and 3 to 50 volts on the collector.

In the following table, there is shown operating characteristics obtained with a three electrode translating device utilizing a P-silicon semi-conductive body having an emitter antimony impurity zone and an N-type silicon having an aluminum impurity zone in accordance with the present invention. Similar data for unformed silicon samples are included to indicate the great enhancement provided by the present invention and data for a conventional germanium transistor is also included in the table to indicate the comparison between it and devices of the present invention. $I_e$ and $I_c$ are emitter and collector current in milliamperes, $V_e$ and $V_c$ are emitter and collector voltage in volts, $R_L$ is the load impedance in ohms, and $$\alpha=\frac{(I_c)}{(I_e)_{V_c}}$$

| | Sample No. | $I_e$ | $I_c$ | $V_e$ | $V_c$ | $R_L$ | $\alpha$ | Dynamic Voltage Gain |
|---|---|---|---|---|---|---|---|---|
| Formed P-type Silicon (antimony impurity zone) | 1 | 3.0 | 10.3 | .2 | 40.5 | 10 K | 1.07 | 23:1 |
| | 2 | 4.5 | 9.0 | .49 | 25.2 | 10 K | 1.0 | 15.3:1 |
| | 3 | .5 | 7.2 | .74 | 25.0 | 20 K | .767 | 15:1 |
| | 4 | .6 | 3.0 | .49 | 18.5 | -------- | 1.6 | 33:1 |
| Formed N-type Silicon (aluminum impurity zone) | 5 | 1.5 | 4.5 | 0.70 | 59.0 | -------- | 1.3 | 25.1 |
| Unformed Silicon (P-type) | 6 | 6.0 | 9.0 | 1.30 | 28.4 | -------- | 0.03 | 1.0 |
| Unformed Silicon (N-type) | 7 | 1.5 | 4.5 | 7.50 | 36.2 | -------- | 0.15 | 1.0 |
| N-Germanium | 8 | .6 | 2.0 | .7 | 40.0 | -------- | 1.8 | 64.5:1 |

In those instances where extremely pure P-silicon has been available such as that having a resistance 5–10 ohm-centimeters, silicon transistors of this material formed by the method of the present invention have consistently produced alphas of about 10 and in some cases as high as 25. These units show dynamic voltage gains in the range of 44 to 60 and power gains near 50. In addition to the transistor action as described hereinabove, it has also been found that the embodiment of the present invention possesses a significantly enhanced photoelectric response and is therefore applicable in those situations where photoelectric semi-conductor devices may be desired.

It is readily to be seen, first, that unformed silicon having a significant impurity therein to impart one type of conductivity thereto cannot be practically utilized as the semi-conductor body of a point contact transistor.

It is secondly, to be noted, however, that by preparing silicon in accordance with the present invention, a transistor device is provided which has characteristics comparable to conventional germanium point contact transistors now in wide use. In addition, the silicon device of the present invention has a very high alpha and its temperature characteristics are stable at a much wider range than germanium transistors opening up a vast field for its use where germanium devices cannot be used.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of preparing a semiconductor body for an electrical translating device, comprising surging an alternating current in an inert gas atmosphere through an arrangement consisting of a probe, a block of silicon material having therein a first significant impurity selected from the group consisting of arsenic, antimony, bismuth and phosphorus, and a small amount of a second significant impurity between said probe and block, said second impurity being selected from the group consisting of boron, aluminum, gallium and indium, until said second impurity flows onto the point of said probe, separating said point from said silicon block a predetermined distance and periodically surging said current to form periodic arcs between said point and said block, whereby said second impurity diffuses into said block and forms an impurity zone extending inwardly from said surface, and gradually cooling said block.

2. The method of preparing a semiconductor body for alternating current in an inert gas atmosphere through an arrangement consisting of a probe, a block of silicon material having therein a first significant impurity selected from the group consisting of boron, aluminum, gallium, and indium, and a small amount of a second significant impurity between said probe and said block, said second impurity being selected from the group consisting of arsenic, antimony, bismuth and phosphorus, until said second impurity flows onto the point of said probe, separating said point from said silicon block a predetermined distance and periodically surging said current to form periodic arcs between said point and said block whereby said second impurity diffuses into said block and forms an impurity zone extending inwardly from said surface, and gradually cooling said block.

References Cited in the file of this patent

UNITED STATES PATENTS

| | | |
|---|---|---|
| 2,449,484 | Jaffe | Sept. 14, 1948 |
| 2,560,594 | Pearson | July 17, 1951 |
| 2,561,411 | Pfann | July 24, 1951 |
| 2,586,080 | Pfann | Feb. 19, 1952 |
| 2,603,694 | Kircher | July 15, 1952 |
| 2,604,496 | Hunter | July 22, 1952 |
| 2,740,076 | Mathews et al. | Mar. 27, 1956 |
| 2,762,955 | Herzog et al. | Sept. 11, 1956 |

UNITED STATES PATENT OFFICE

CERTIFICATE OF CORRECTION

Patent No. 2,854,362 September 30, 1958

Frank A. Brand et al.

It is hereby certified that error appears in the printed specification of the above numbered patent requiring correction and that the said Letters Patent should read as corrected below.

Column 6, line 4, claim 2, after "for" insert -- an electrical translating device comprising surging an --.

Signed and sealed this 30th day of June 1959.

(SEAL)
Attest:

KARL H. AXLINE
Attesting Officer

ROBERT C. WATSON
Commissioner of Patents